United States Patent
Restivo et al.

(10) Patent No.: US 7,397,818 B2
(45) Date of Patent: Jul. 8, 2008

(54) ASYMMETRIC BANDWIDTH ALLOCATION

(75) Inventors: Silvia Restivo, Rome (IT); Patrizia Testa, Isernia (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 794 days.

(21) Appl. No.: 10/492,141

(22) PCT Filed: Oct. 19, 2001

(86) PCT No.: PCT/IT01/00531

§ 371 (c)(1),
(2), (4) Date: Apr. 7, 2004

(87) PCT Pub. No.: WO03/034767

PCT Pub. Date: Apr. 24, 2003

(65) Prior Publication Data
US 2004/0208194 A1    Oct. 21, 2004

(51) Int. Cl.
*H04J 3/16* (2006.01)
(52) U.S. Cl. ............ 370/468; 370/329; 370/336; 370/443
(58) Field of Classification Search ........ 370/468, 370/329, 336, 443
See application file for complete search history.

(56) References Cited

U.S. PATENT DOCUMENTS

| | | | | |
|---|---|---|---|---|
| 6,542,481 | B2 * | 4/2003 | Foore et al. | 370/329 |
| 7,023,798 | B2 * | 4/2006 | Bourlas et al. | 370/230 |
| 2001/0038620 | A1 * | 11/2001 | Stanwood et al. | 370/336 |
| 2002/0098821 | A1 * | 7/2002 | Struhsaker | 455/305 |
| 2005/0089064 | A1 * | 4/2005 | Zimmerman et al. | 370/468 |
| 2006/0146863 | A1 * | 7/2006 | Spinar et al. | 370/449 |

* cited by examiner

*Primary Examiner*—Chi Pham
*Assistant Examiner*—Albert T. Chou
(74) *Attorney, Agent, or Firm*—Roger S. Burleigh (57) ABSTRACT

A method of determining the position of the split between uplink and downlink bandwidth, in a point of multipoint radio access system with time division duplex scheme comprising a certain number of user terminals and a base station has been disclosed, wherein there are at least two quality of service classes, a first class for guaranteed services (RT) and a second class for not-guaranteed/best effort services (BE). The MAC layer evaluates and controls a further movement of the split—as that initially determined by a Call Admission Control (CAC)—according to the behavior of uplink and downlink not-guaranteed/best effort queues observed during a certain observation period.

6 Claims, 6 Drawing Sheets

ASYMMETRIC BANDWIDTH ALLOCATION

FIELD OF THE INVENTION

The present invention relates to the field of the point-to-multipoint fixed radio access systems adopting the Time Division Duplexing (TDD) scheme with time division multiplex access (TDMA) but is applicable to other multiplexing techniques such frequency or code division multiplex access (FDMA, CDMA). The invention concerns the Medium Access Control (MAC) layer for providing an efficient way to share the radio link capacity.

BACKGROUND OF THE INVENTION

Point-to-multipoint fixed radio access systems consist of one base station, which is the central unit, and multiple User Terminals that exchange data with the base station. Usually a fixed length frame structure is used and, within such frame, uplink and downlink capacity is dynamically allocated.

The layer architecture of these systems consists of a Physical Layer, Medium Access Control (MAC) layer, a Convergence Layer (CL) and user layers. The main function of MAC layer is the radio resource management. Not all subscriber terminals, which share the upstream period on a demand basis, can transmit at the same time successfully as they can in a dedicated-medium situation. The base station MAC protocol determines who transmits and when, providing the appropriate transmission capacity.

Two basic duplexing methods can be supported by point-to-multipoint radio access systems: Time Division Duplex (TDD) and Frequency Division Duplex (FDD). The nature of the traffic being carried influences the choice of the duplex scheme.

The FDD provides two-way radio communication using paired radio frequency bands: one band for the transmission in the forward link, the other for the transmission in the reverse direction. For practical reasons, once the bandwidth dedicated to the two channels has been set, an immovable boundary in frequency/bandwidth is consequently set. These paired bands typically are of equal capacity. If the uplink/downlink bandwidth needs vary with time, sometimes the bandwidth will be wasted (low demand), and sometimes it will be inadequate (high demand). So this technique is ideal for symmetric communications in which the information flows in both directions are comparable in terms of capacity.

The TDD transmission technique requires a single carrier for full duplex communications. Transmit/receive separation occurs in the time domain as opposed to the frequency domain. Transmission direction alternates between downlink and uplink using a repetitive frame structure. Within such structure, the capacity of the carrier is divided between downlink and uplink transmission in direct proportion to the desired throughput. A 50% distribution between downlink and uplink time slots results in a symmetric, full duplex throughput. Moving the time boundary between downlink and uplink results in an asymmetric throughput and in an efficient accommodation of the channel requirements for bursty data traffic.

Summarising: FDD can adequately handle traffic that has relatively constant bandwidth requirements in both communication directions. On the other hand, TDD better manages time-varying uplink/downlink traffic because of the nature itself of the duplex scheme, which matches the traffic behaviour.

Figure 1:
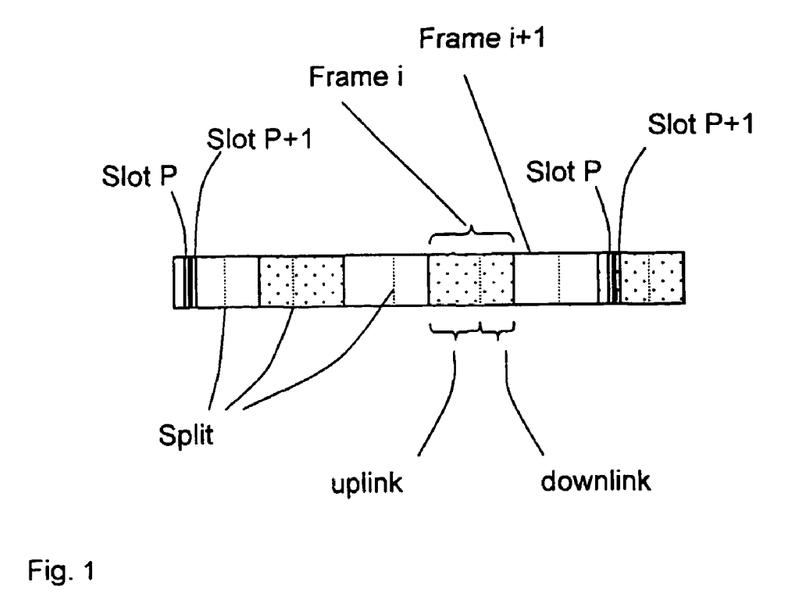
FIG. 1 shows a known frame format for asymmetric bandwidth allocation.

When the ratio between the allocated downlink frame portion and the uplink one varies in time, the TDD scheme is called dynamic or adaptive. The utilisation of adaptive TDD in fixed radio access systems involves an efficient use of the available spectrum when asymmetric and unpredictable traffic represents a considerable percentage of the traffic load of the system. Such dynamic TDD scheme has been depicted in FIG. 1. It is seen that the frame length comprises a fixed number of slots but that the split between up and downlink traffic varies.

Document "MAC Proposal for IEEE 802.16.1", IEEE 802.16.1mc-00/10 of 2000-02-25 discloses a broadband communication standard proposal that makes use of TDD and various quality of service classes (QoS).

According to the above document, when a fixed radio access system adopts a dynamic TDD scheme, the split between uplink and downlink is a system parameter that is controlled at higher layers and that depends on the adopted Call Admission Control policies within the system. When the TDD split changes this is communicated to the MAC layer from higher layers via the control Service Access Point (SAP). Hence, the split movement is driven by services requesting bandwidth guarantees that the CAC takes care of.

For the above known point to multipoint fixed radio access TDD, the main function of the Medium Access Control (MAC) layer is the radio resource management. The Call Admission Control functionality resides at a higher layer (Network layer).

The Call Admission Control determines periodically the amount of bandwidth devoted to the uplink and downlink transmission. The MAC layer follows the information on the amount of bandwidth devoted to the uplink and downlink transmission coming from the Call Admission Control and allocates the uplink slots frame by frame to the different user terminals and the downlink slots frame by frame to the downlink traffic (traffic from the Base Station towards the user terminals). The Mac layer does its job without modifying the uplink/downlink amount of bandwidth, i.e. the position of the split once having been decided by the Call Admission Control is not moved by the Mac layer.

The known allocation procedure can be summarised by the following steps:

1. Periodically the Call Admission Control (CAC) analyses the guaranteed uplink and downlink traffic.
2. The Call Admission Control (CAC) evaluates the position of the split according to the guaranteed uplink and downlink traffic behaviour (if there have been no significant changes in the traffic the split position remains the same evaluated the period before).
3. The Call Admission Control (CAC) signals the information on the split position to the MAC layer.
4. The Mac layer allocates the resources frame by frame to the User terminals and to the Base station using its scheduling policy but always according to the amount of bandwidth devoted to the uplink and downlink transmission corresponding to the split evaluated at step 2.

The above TDD scheme does not take in consideration, for deciding the downlink/uplink split movement, the behaviour of the Best Effort traffic (or in general not guaranteed traffic). The term Best Effort refers to non real time services, usually-Internet services such as Web Browsing, E-mailing, FTP (File Transfer Protocol) and file sharing.

In the last few years, the demand in capacity for the latter type of services has increased substantially. Every category of user now wants Internet access as a basic service and the number of Internet connections continues to rise exponentially. If Internet access is the prime interest for a majority of customers then traffic will be very bursty and the overall downlink/uplink capacity ratio in the system may vary considerably.

In known dynamic TDD systems the bandwidth allocated to the best effort traffic is usually a fixed quantity that reflects the expected load of the Best Effort traffic evaluated only once during the dimensioning phase of the system. In this way the significant and unpredictable variations in time of the Best Effort traffic are not considered, and so it may happen that the downlink suffers of a lack of bandwidth, while the uplink is not using part of its allocated one, or vice versa.

Prior art document U.S. Pat. No. 5,602,836 shows a method for dynamically allocating bandwidth between up and downlink traffic in a TDMA system. The partition, also called split, between up and down-link slots in each frame is regulated, although the total number of slots are remains fixed for every frame. When few users use the system in relation to full capacity, the system operates like fixed partition TDD systems with equal up- and down-link slots in each frame. However, if the traffic in either direction exceeds half the available slots, the location of the split is adapted to the demand. If more than half the available slots are required in both directions, the split is set to half the available slots in both directions. The system adapts a circular interleaving method for separate queues for up and downlink traffic.

U.S. Pat. No. 5,768,254 shows a system aiming at reducing the runlength of dropped packets or the co-channel interference using adaptive TDD.

SUMMARY OF THE INVENTION

It is a first object of the invention to adequately respond to not-guaranteed traffic bandwidth requirements variations by a dynamic TDD scheme compatible with higher layer basic split decisions.

This object has been accomplished by the subject matter of claim 1.

It is another object of the invention to provide monitoring of best effort queues.

This object has been achieved by the subject matter according to claim 2.

It is another object of the invention to provide a set of parameters useful for determining the split position.

This object has been achieved by the subject matter according to claim 3.

It is another object to provide a further movement of the split making the percentage of losses/wastes in downlink and in uplink comparable, i.e. applying a sort of fairness criteria.

This object has been achieved by the subject matter according to claim 4.

It is another object of the invention to provide a preferred procedure for the evaluation of the uplink and downlink bandwidth values in case the amount of bandwidth required by the guaranteed services is less than the total available system bandwidth.

This object has been achieved by the subject matter according to claim 5.

It is another object of the invention to provide a preferred procedure for the evaluation of the uplink and downlink bandwidth values in case a certain amount of bandwidth is left free by higher layers in order to compensate the instantaneous peak variations of the guaranteed services.

This object has been achieved by the subject matter according to claim 6.

Further advantages will appear from the following detailed description of the invention.

DETAILED DESCRIPTION OF PREFERRED EMBODIMENTS OF THE INVENTION

The invention concerns a point to multipoint radio access system with time division duplex scheme using a frame format of fixed duration.

The system operates with at least two quality of service (QoS) classes; a class of guaranteed service, adapted for real time services such as speech, in the following denoted RT, and a class of non-guaranteed/best effort service, in the following denoted BE, suitable for file transfer, e-mail, etc.; i.e. services which may endure a delay.

Figure 2:
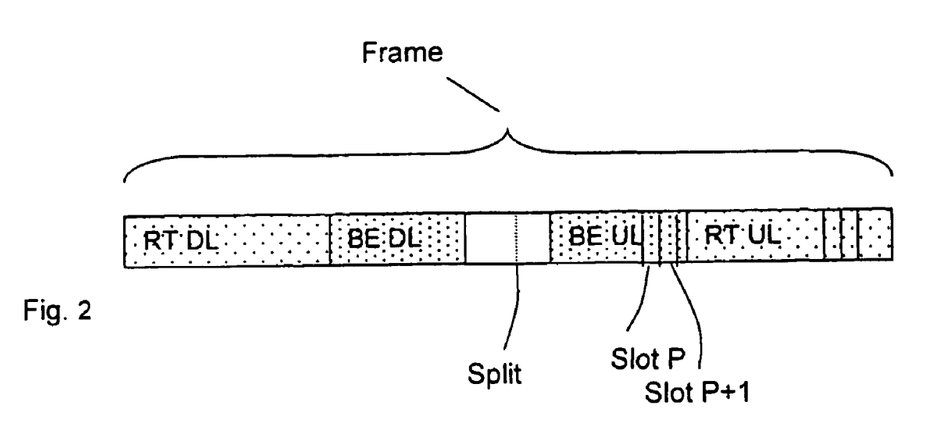
FIG. 2 shows an example of bandwidth partition within a frame.

The slots in a given frame are allocated to BE downlink traffic, RT downlink traffic, BE uplink traffic and RT uplink traffic, according to the classes priority and to uplink and downlink requests of each class. One exemplary allocation of the slot assignment for a given frame has been shown in FIG. 2.

Figure 3:
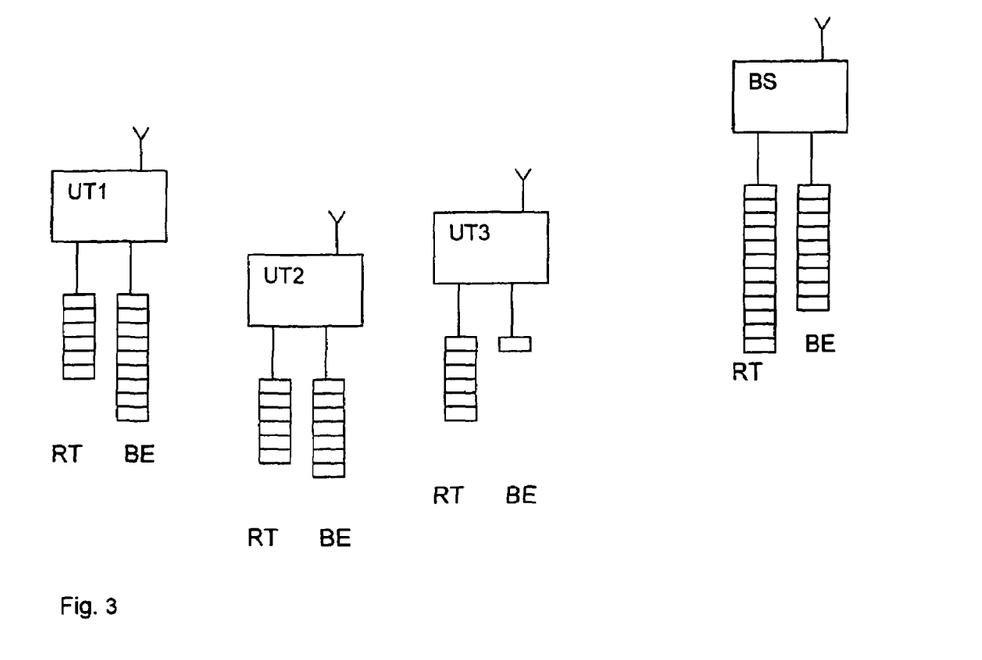
FIG. 3 shows an overview of the system according to the invention.

In FIG. 3 an overview of the system has been given. The system comprises a Base Station (BS) and a certain number of User Terminals (UT1, UT2, UT3). At the Base Station and at each User Terminal the traffic flows, according to their QoS requirements, are buffered in the RT and BE queues.

The base station MAC (medium access control) layer has information on the status of the uplink and downlink queues, since in the considered systems the User Terminals transmit the information of their queues states to the Base Station.

The present invention relies on information present at the MAC layer on the status of the Best Effort queues and on the information coming from higher layers in order to provide a smarter splitting between uplink and downlink. Such further splitting makes the system capable of following the Best Effort traffic variations avoiding waste of bandwidth and without modifying neither the fixed bandwidth allocation for the Best Effort services nor the one devoted to the real time services.

According to a first step of the preferred procedure, a bandwidth allocation in uplink and downlink is made by the MAC layer, frame by frame, in order to satisfy the requirements of the guaranteed service connections, i.e. the RT traffic accepted by the Call Admission Control, and of a minimal percentage of uplink and downlink bandwidth related to the expected load of not-guaranteed traffic, i.e. the BE traffic.

The remaining free slots will be appropriately allocated by the MAC layer, frame by frame according to a second step, whereby not guaranteed services, i.e. BE traffic, and/or instantaneous peak variations of the guaranteed services, i.e. RT traffic, are allocated. The split between up and downlink free slots devoted to BE/not guaranteed traffic is determined on a frame by frame basis/observation period basis.

As explained above, the number of the total remaining free slots in the system at a certain instant (after the first step in the allocation procedure) depends on the Call Admission Control decision. The aim of the invention is to use these free slots, dividing them between uplink and downlink, in an efficient and dynamic way.

More specifically, the following steps are carried out in a preferred routine of the invention:
1. Periodically the Call Admission Control (CAC) analyses the guaranteed uplink and downlink traffic.
2. The position of the split according to the guaranteed uplink and downlink traffic behaviour is evaluated, whereby if there have been no significant change in the traffic, the split position remains the same and if there have been a change in the traffic, the split is moved.
3. The call admission control (CAC) signals the split position to the MAC layer.
4. The base station medium access control (MAC) layer monitors the status of best effort (BE) uplink and downlink queues averaging them during an observation period.
5. Every observation period, the base station medium access control (MAC) layer evaluates a further movement of the split.
6. According to the evaluated split position, the base station medium access control (MAC) layer allocates the resources frame by frame to the user terminals and to the base station using its scheduling policy.

The routine driving the decision on the split movement according to the invention shall now be explained.

Figure 4:
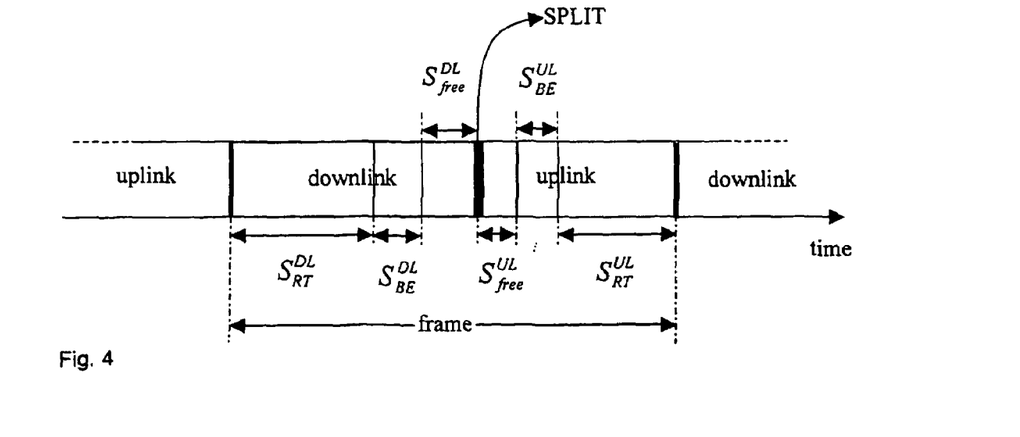
FIG. 4 shows various definitions regarding an exemplary bandwidth partition within a frame.

Let be:
S the total radio link capacity
$S^{DL}$ the total amount of bandwidth allocated to the downlink by higher layers
$S_{RT}^{DL}$ the amount of bandwidth allocated to the not-Best Effort services on the downlink
$S_{BE}^{DL}$ the fixed amount of bandwidth allocated to the Best Effort services on the downlink
$S^{UL}$ the amount of bandwidth allocated to the uplink by higher layers
$S_{RT}^{UL}$ the amount of bandwidth allocated to the not-Best Effort services on the uplink
$S_{BE}^{UL}$ the fixed amount of bandwidth allocated to the Best Effort services on the uplink The amount of bandwidth not related to any constraints in downlink is equal to $$S_{free}^{DL} = S^{DL} - S_{RT}^{DL} - S_{BE}^{DL} \quad (1)$$

and for the uplink $$S_{free}^{UL} = S^{UL} - S_{RT}^{UL} - S_{BE}^{UL} \quad (2)$$

as shown in FIG. 4.

Let's define $q_{BE}^{DL}(i)$ the state of the Best Effort queue inside the Base Station at the i'th frame and $q_{BE}^{UL}(i,p)$ the state of the Best Effort queue inside the p'th User Terminal known by the Base Station at the i'th frame. Then consider:

$$q_{BE}^{UL}(i) = \sum_{p=1}^{M} q_{BE}^{UL}(i, p) \quad (3)$$

where M is the number of the User Terminals within the system.

The behaviour of the Best Effort traffic entering the system is monitored and the queue states are averaged for a certain period. This period is called observation period and it is chosen to be an integer multiple of the frame length. So define N as the observation period length expressed in frames. Every N frames let's evaluate the average state of the queues; for the k'th observation period it will be:

$$\bar{q}_{BE,k}^{DL} = \frac{\sum_{j=k}^{k+N-1} q_{BE}^{DL}(j)}{N} \quad \text{and} \quad (4)$$

$$\bar{q}_{BE,k}^{UL} = \left[\sum_{j=k}^{k+N-1} \sum_{p=1}^{M} q_{BE}^{UL}(j, p)\right] / N \quad (5)$$

where $k = 1, N+1, 2N+1, 3N+1, \ldots$

Figure 5:
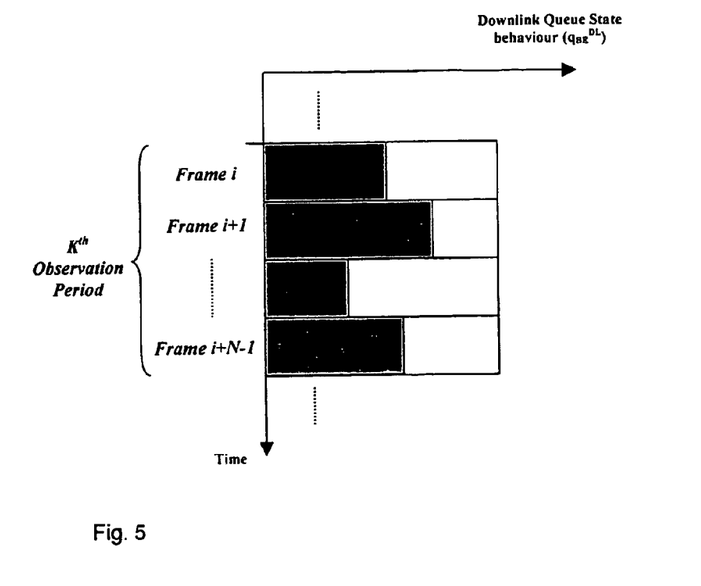
FIG. 5 shows best effort downlink queues monitored according to the invention.
Figure 6:
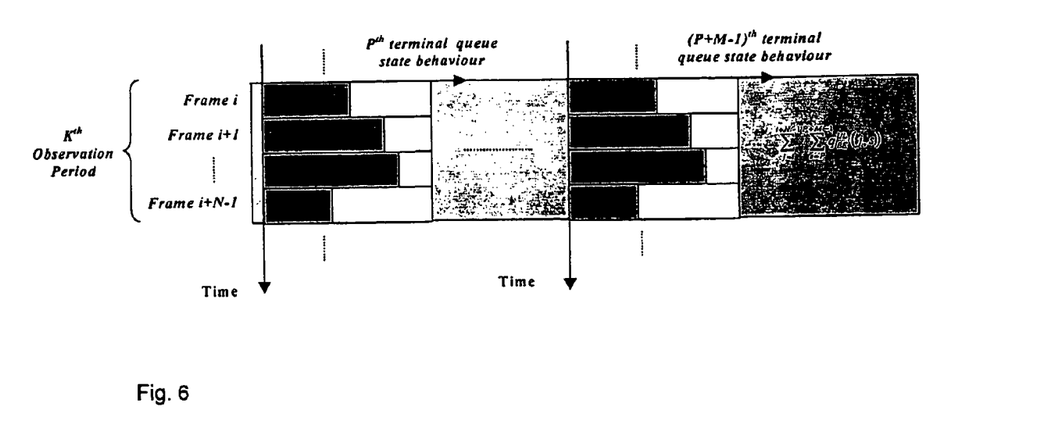
FIG. 6 shows best effort uplink queues monitored according to the invention.

FIG. 5 refers to the BE downlink queue state of the Base Station (i.e. the BE traffic load to be sent on the downlink). The x-axis refers to the total quantity of BE data waiting to be sent on the downlink. FIG. 6 refers to the BE uplink queues states of the User Terminals (i.e. the BE traffic load to be sent on the uplink). So in this figure the x-axis refers to the total quantity of data waiting to be sent on the uplink. In FIG. 5 and 6, the y-axis show the past number of executed frames i to i+N−1 (past frames). The executed frames are grouped in observation periods of N frames.

The queues for more frames are examined because the system may not be able to decide the split position efficiently from a frame to frame basis but only over a longer period.

According to the invention, the queue behaviour is estimated by averaging the queue state values over every observation period. In an extreme case, if the observation period is equal to one frame, the queues are examined on a frame by frame basis.

In FIG. 6, the grey area denoted the double sum corresponds to the total sum of uplink queues for all User Terminals within a given observation period.

If we compare the above average values in (4) and (5) with the allocated bandwidth during the considered observation period, we obtain a measurement of the average experienced lack or waste of bandwidth in both directions.

Figure 7:
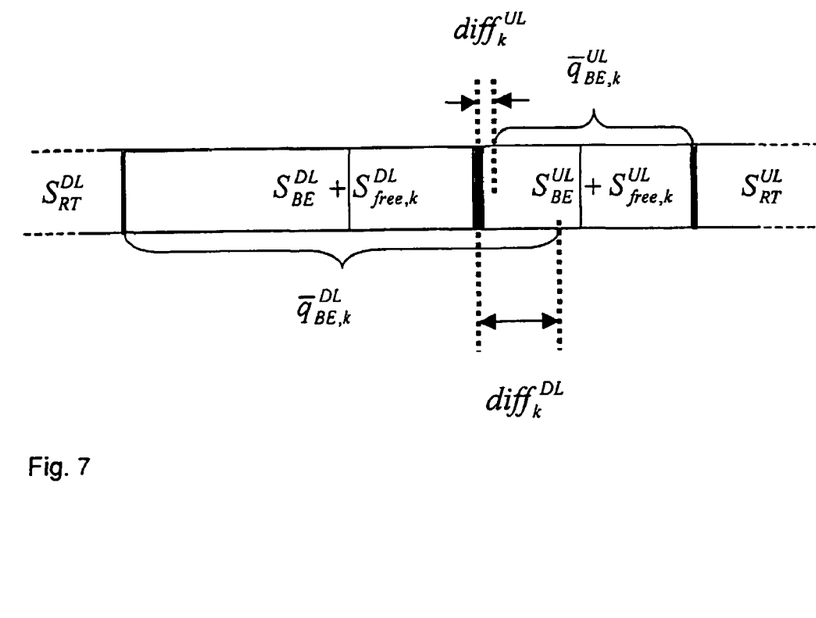
FIG. 7 shows a graphical example of other defined variables useful for the split movement evaluation according to the invention.

Let's then define:

$$\text{diff}_k^{DL} = \bar{q}_{BE,k}^{DL} - S_{BE}^{DL} - S_{free,k}^{DL} \quad (6)$$

and $$\text{diff}_k^{UL} = \bar{q}_{BE,k}^{UL} - S_{BE}^{UL} - S_{free,k}^{UL} \quad (7)$$

that therefore represent the bandwidth portions of which it would have been necessary to increase or decrease the downlink/uplink bandwidth in order to satisfy the mean request of BE traffic experienced during the k'th observation period by downlink/uplink, as depicted in FIG. 7.

Figure 8:
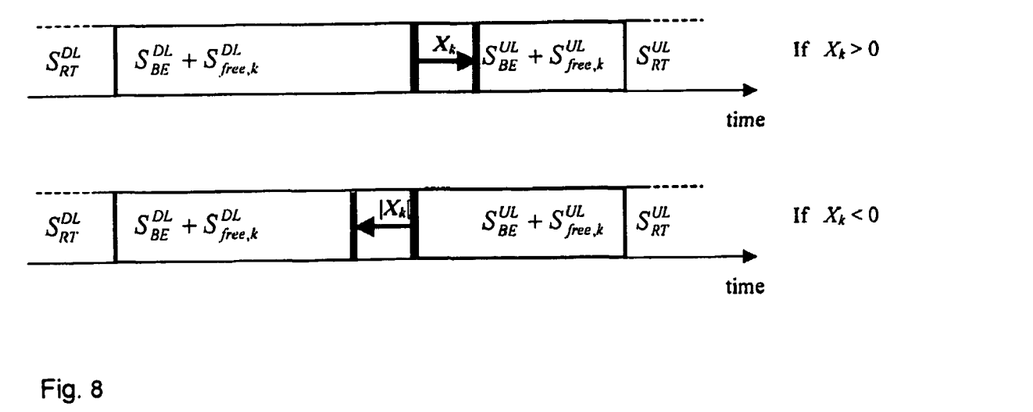
FIG. 8 shows an example of the split movement according to the invention

As shown in FIG. 7, one can note that most of the time, the more difficult part of the split decision is not where to move it but how much to move it. Suppose now to apply a split movement of a quantity Xk, where a positive value of Xk means a split movement towards the uplink and consequently an increase in $S_{free}^{DL}$ and a decrease in $S_{free}^{UL}$, while a negative value of Xk means a split movement towards the downlink and consequently a decrease in $S_{free}^{DL}$ and an increase in $S_{free}^{UL}$, as shown in FIG. 8.

Once having implemented such movement the quantity $diff_k^{DL} - X_k$ is equal to the average bandwidth portion per frame that the downlink did not obtain or use while $diff_k^{UL} + X_k$ is the average bandwidth portion per frame that the uplink did not use or obtain.

The above values represent the predicted losses/wastes for the downlink and for the uplink if the Best Effort traffic maintains the same behaviour it had during the last N frames. In order to make the percentage of losses/wastes in downlink and in uplink comparable, i.e. applying a sort of fairness criteria, the following equation shall be verified:

$$\frac{diff_k^{DL} - X_k}{\bar{q}_{BE,k}^{DL}} = \frac{diff_k^{UL} + X_k}{\bar{q}_{BE,k}^{UL}} \quad (8)$$

from which it follows that:

$$X_k = \text{round}\left(\frac{diff_k^{DL} \times \bar{q}_{BE,k}^{UL} - diff_k^{UL} \times \bar{q}_{BE,k}^{DL}}{\bar{q}_{BE,k}^{DL} + \bar{q}_{BE,k}^{UL}}\right) \quad (9)$$

So that, if $X_k > 0$: (10)

$$\begin{cases} S_{k+1}^{DL} = S_k^{DL} + \min(X_k, S_{free,k}^{UL}) \\ S_{k+1}^{UL} = S_k^{UL} - \min(X_k, S_{free,k}^{UL}) \end{cases}$$

$$\begin{cases} S_{free,k+1}^{DL} = S_{free,k}^{DL} + \min(X_k, S_{free,k}^{UL}) \\ S_{free,k+1}^{UL} = S_{free,k}^{UL} - \min(X_k, S_{free,k}^{UL}) \end{cases} \quad (11)$$

if $X_k < 0$: (12)

$$\begin{cases} S_{k+1}^{DL} = S_k^{DL} - \min(|X_k|, S_{free,k}^{DL}) \\ S_{k+1}^{UL} = S_k^{UL} + \min(|X_k|, S_{free,k}^{DL}) \end{cases}$$

$$\begin{cases} S_{free,k+1}^{DL} = S_{free,k}^{DL} - \min(|X_k|, S_{free,k}^{DL}) \\ S_{free,k+1}^{UL} = S_{free,k}^{UL} + \min(|X_k|, S_{free,k}^{DL}) \end{cases} \quad (13)$$

The resulting values $S_{k+1}^{DL}$, $S_{k+1}^{UL}$, $S_{free,k+1}^{DL}$ and $S_{free,k+1}^{UL}$ will be valid for the following observation period, the (k+1)th, at the end of which the new bandwidth values are calculated, using again the formulas (6)÷(13).

Figure 9:
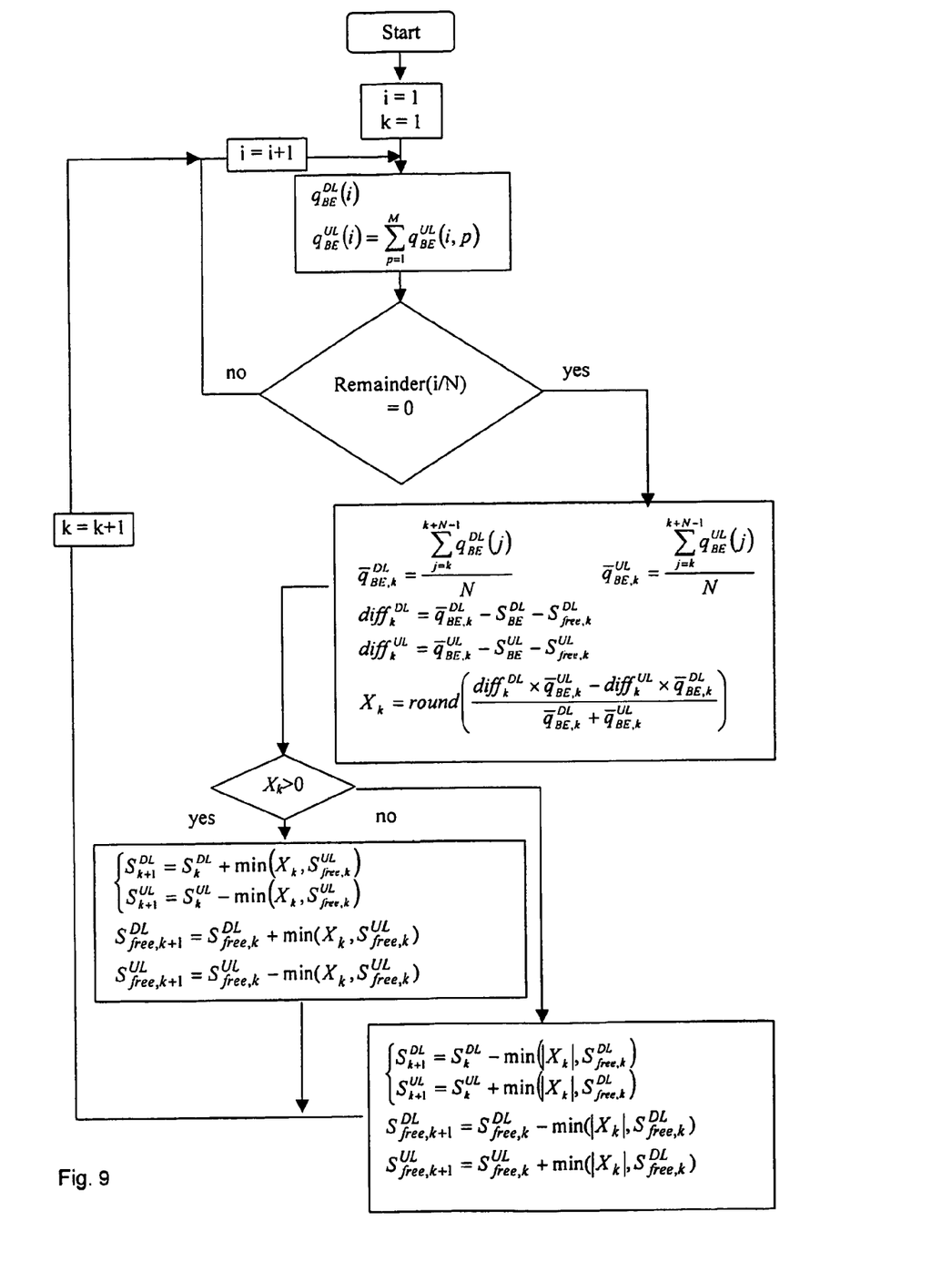
FIG. 9 shows a first preferred routine for determining the further movement of the split according to the invention in case the free bandwidth is exclusively devoted to satisfy the not-guaranteed services bandwidth requests.

The above routine has been shown in FIG. 9.

Usually, there are two reasons behind the existence of free bandwidth, within the considered systems. The first reason—which is taken into consideration until now—may be that the amount of bandwidth required by the guaranteed services is less than the total available system bandwidth. The second reason may be that a certain amount of bandwidth is left free by higher layers in order to compensate the instantaneous peak variations of the guaranteed services. Therefore the free bandwidth that can be used for Best Effort services, as previously stated, is only the amount that the guaranteed services do not need.

Figure 10:
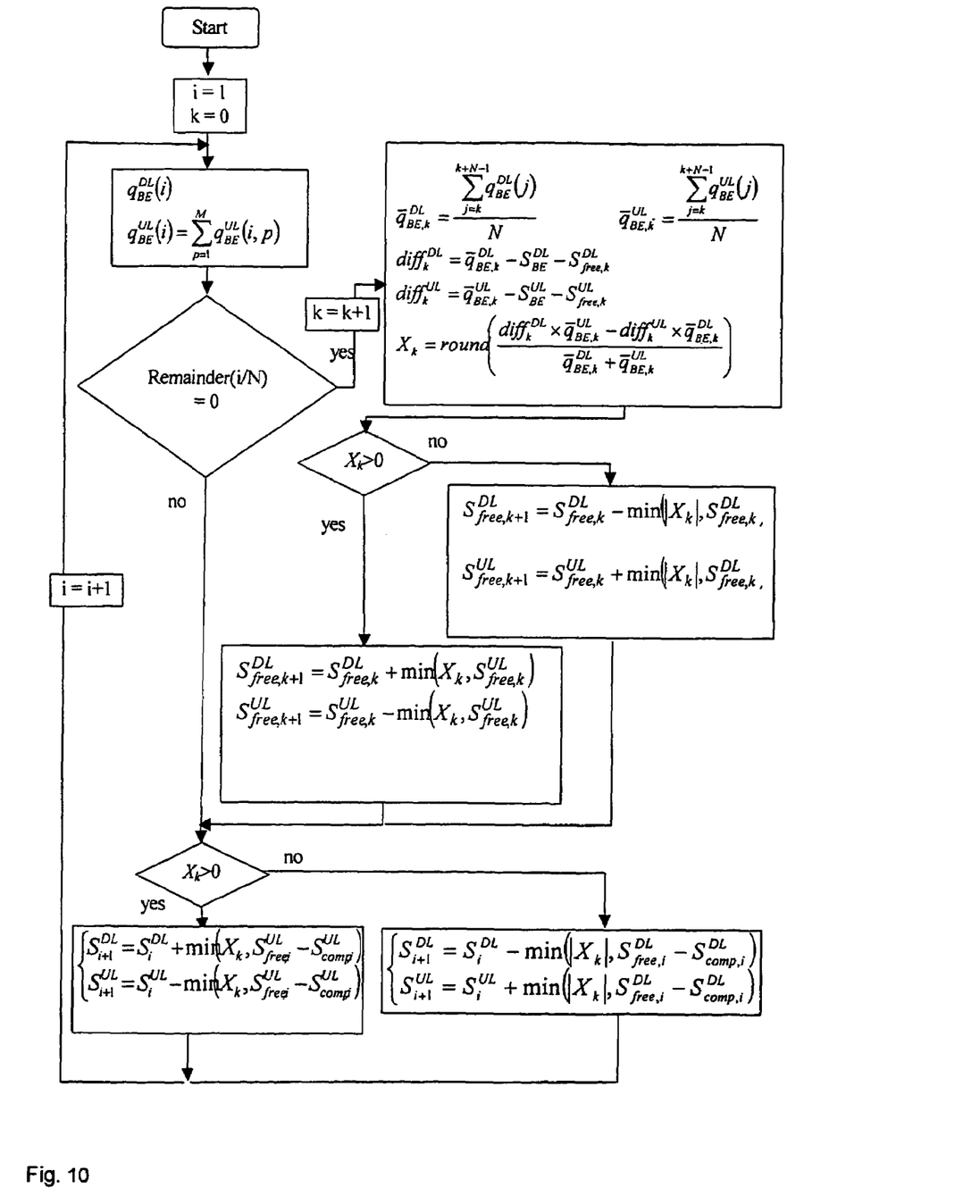
FIG. 10 shows a second preferred routine for determining the further movement of the split according to the invention in case the free bandwidth is devoted at first to compensate the instantaneous peak variations of guaranteed services and then to satisfy the not-guaranteed services bandwidth requests.

So, in order to include the latter case, a second routine according to the invention is defined as follows:

The (6) to (9), (11) and (13) remain valid, i.e. the split movement Xk and the downlink and uplink free bandwidth $S_{free,k+1}^{DL}$ and $S_{free,k+1}^{UL}$ are evaluated in the same manner once in every k'th period;

The formulas (10) and (12) instead are evaluated frames by frame in the following way:

$$\begin{cases} S_{i+1}^{DL} = S_i^{DL} + \min(X_k, S_{free,i}^{UL} - S_{comp,i}^{UL}) \\ S_{i+1}^{UL} = S_i^{UL} - \min(X_k, S_{free,i}^{UL} - S_{comp,i}^{UL}) \end{cases} \quad (14)$$

$$\begin{cases} S_{i+1}^{DL} = S_i^{DL} - \min(|X_k|, S_{free,i}^{DL} - S_{comp,i}^{DL}) \\ S_{i+1}^{UL} = S_i^{UL} + \min(|X_k|, S_{free,i}^{DL} - S_{comp,i}^{DL}) \end{cases} \quad (15)$$

where $S_{comp,i}^{DL}$ and $S_{comp,i}^{UL}$ represent the amount of bandwidth used at the i'th frame by the guaranteed services to compensate their instantaneous peak variations, i=k, k+1, ... k+N−1 is the current frame and k=1, N+1, 2N+1, ... is the current observation period. The above routine has been shown in FIG. 10.

The advantages of the present invention can be summarised as follows:

If the Best Effort/not-guaranteed traffic is highly asymmetric, the proposed TDD has a significant gain on the Best Effort/not-guaranteed throughput and traffic losses with respect to known systems.

Even if the Best Effort/not-guaranteed traffic experienced by the system is only slightly asymmetric, the proposed TDD has a certain gain on the system Best Effort/not-guaranteed throughput with respect to the classical dynamic TDD.

The proposed TDD reduces considerably the amount of unused bandwidth with respect to known systems.

According to the invention, the total Best Effort/not-guaranteed packet loss probability of the system is minimised.

Since the invention makes use of a simple monitoring of the Best Effort/not-guaranteed queues, it can be easily implemented in existing systems.

Moreover, the preferred embodiments of the invention are compatible with uplink-downlink bandwidth split decisions taken at higher layers.

The invention is also applicable to systems using retransmission mechanisms of lost packets. In this case, the throughput gain of the invention becomes even more conspicuous in relation to known TDD systems.

Finally, it can be noted that since the allocated bandwidth is controlled according to the various queue states, not only a gain in terms of throughput but also a decrease of packet delay have been accomplished.

The invention claimed is:

1. A method of determining and effectuating split positions between uplink and downlink bandwidth in a point to multipoint radio access system, wherein the system utilizes a time division duplex scheme on a frame by frame basis and with at least two quality of service classes, a first class for guaranteed services (RT) and a second class of best effort services (BE); wherein, within every frame a portion of bandwidth is devoted to uplink traffic and another portion to downlink traffic, and wherein a split between uplink and downlink bandwidth is controlled by a call admission controller (CAC), and wherein scheduling of traffic is performed according to a scheduling policy carried out by a medium access control (MAC) layer, said method comprising the steps of:

said medium access control (MAC) layer monitoring the status of best effort (BE) uplink and downlink queues and averaging them during an observation period;

for every observation period, said medium access control (MAC) layer evaluating a further movement of the split; and according to the evaluated split position, said medium access control (MAC) layer allocating resources frame by frame to user terminals and to a base station using its scheduling policy.

2. The method recited in claim 1, wherein the behavior of the best effort queues is evaluated by averaging the states of the best effort (BE) downlink (DL) queues ($q_{BE,k}^{-DL}$) and of the best effort uplink (UL) queues ($q_{BE,k}^{-UL}$) once every observation period k.

3. The method recited in claim 2, wherein quantities $q^{BE,k-DL}$ and $q_{BE,k}^{-UL}$, related to the behavior of the best effort traffic entering the system are used to calculate variables $\text{diff}_k^{DL}$ and $\text{diff}_k^{UL}$, representing the bandwidth portion it would have been necessary to increase or decrease in order to satisfy the mean request of Best Effort traffic experienced during the current observation period by downlink/uplink, whereby a first quantity ($\text{diff}_k^{DL} - X_k$), being equal to the average bandwidth per frame that the downlink will not use or obtain within the next observation period in case the Best Effort downlink traffic maintains the same behavior it had in the current observation period, is defined, and whereby a second quantity ($\text{diff}_k^{UL} + X_k$), being equal to the average bandwidth per frame that the uplink will not use or obtain within the next observation period in case the Best Effort downlink traffic maintains the same behavior it had in the current observation period is defined, $X_k$ being the supposed value of the split movement, wherein a positive value of $X_k$ implies a decrease of the uplink bandwidth while a negative value of $X_k$ implies a decrease of the downlink bandwidth.

4. The method recited in claim 3, wherein once evaluated the $X_k$ quantity making equal the ratio between $\text{diff}_k^{DL} - X_k$ and the average state of the best effort downlink queues ($q_{BE,k}^{-DL}$) and the ratio between $\text{diff}_k^{UL} + X_k$ and the average state of the best effort uplink queues ($q_{BE,k}^{-UL}$), the further movement of the split being calculated choosing the minimum value between $|X_k|$ and the available free band-width.

5. The method recited in claim 4, wherein the uplink and downlink bandwidth values are calculated at the end of every observation period, making use of the evaluated split movement and of the free uplink and downlink bandwidth.

6. The method recited in claim 4, wherein the uplink and downlink bandwidth values are evaluated frame by frame making use of the split movement and of the free uplink and downlink bandwidth calculated at the end of every observation period.

* * * * *

UNITED STATES PATENT AND TRADEMARK OFFICE
CERTIFICATE OF CORRECTION

PATENT NO. : 7,397,818 B2  Page 1 of 1
APPLICATION NO. : 10/492141
DATED : July 8, 2008
INVENTOR(S) : Restivo et al.

It is certified that error appears in the above-identified patent and that said Letters Patent is hereby corrected as shown below:

In Column 7, Lines 50-51, delete " $S^{UL}_{free,k+1}$ " and insert -- $S^{UL}_{free,k+1}$ --, therefor.

In Column 8, Line 3, delete " $S^{DL}_{free,k+1}$ " and insert -- $S^{DL}_{free,k+1}$ --, therefor.

In Column 9, Lines 14-15, in Claim 3, delete " $q^{-DL}_{BE,k}$ " and insert -- $q^{-DL}_{BE\ k}$ --, therefor.

In Column 9, Line 17, in Claim 3, delete " $diff^{DL}_k$ " and insert -- $diff^{DL}_k$ --, therefor.

Signed and Sealed this

Tenth Day of March, 2009

JOHN DOLL
*Acting Director of the United States Patent and Trademark Office*